Aug. 6, 1940. W. A. LEWIS 2,210,680
OUT-OF-STEP PROTECTION FOR TRANSMISSION SYSTEMS
Filed March 18, 1939 3 Sheets—Sheet 3
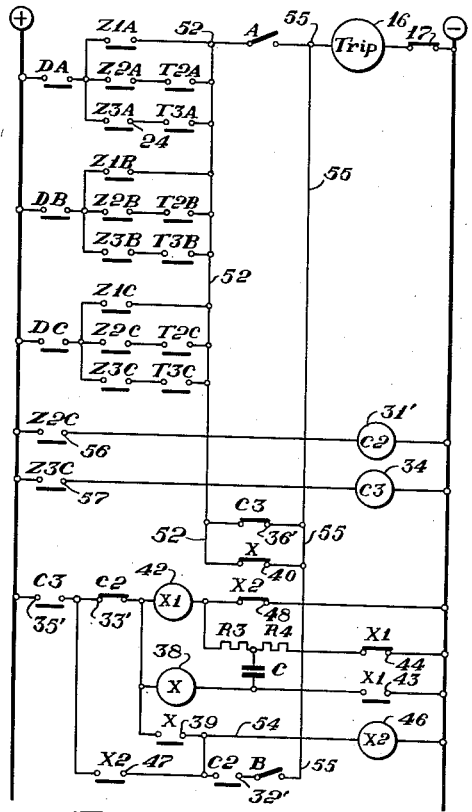
Fig. 3.
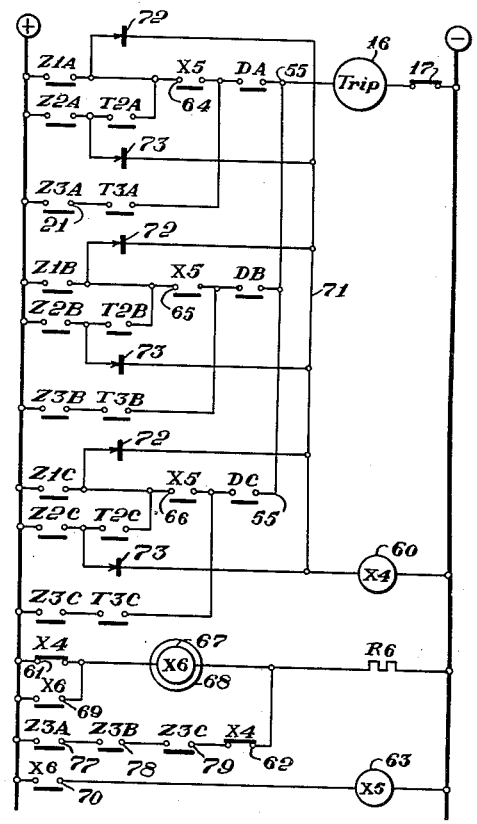
Fig. 4.
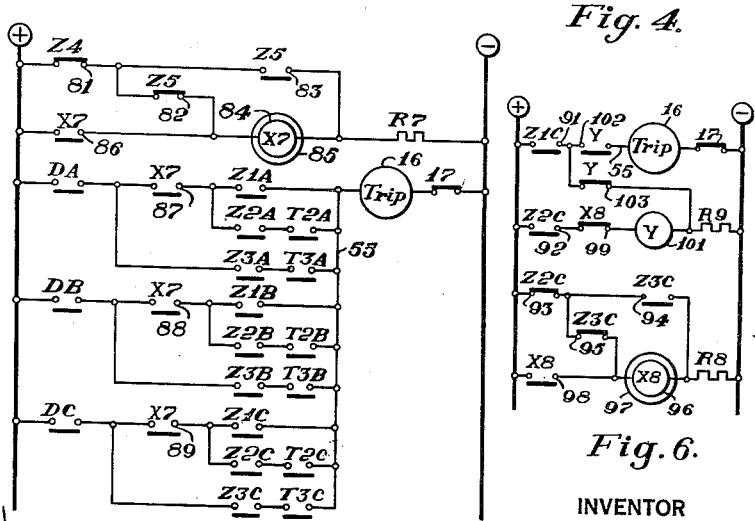
Fig. 5.
Fig. 6.
WITNESSES:
Edward Michaels
Wm. C. Groome
INVENTOR
William A. Lewis.
BY O. B. Buchanan
ATTORNEY Patented Aug. 6, 1940

2,210,680

UNITED STATES PATENT OFFICE 2,210,680

OUT-OF-STEP PROTECTION FOR TRANSMISSION SYSTEMS

William A. Lewis, Ithaca, N. Y., assignor to Westinghouse Electric & Manufacturing Company, East Pittsburgh, Pa., a corporation of Pennsylvania Application March 18, 1939, Serial No. 262,790

36 Claims. (Cl. 175—294)

My invention relates to fault-responsive protective relaying systems for a polyphase line, and it has particular relation to such systems in which provision is made for out-of-synchronism conditions.

When two interconnected power systems pull out of step, the relative values of voltages and currents are such as to indicate a three-phase fault somewhere in the interconnection. If this three-phase fault-indication is in the zone of high-speed impedance relays, it will cause them to trip their associated oil circuit-breakers, or, in general, to effect a line-sectionalizing operation. Indiscriminate opening of circuit breakers, in an interconnection line, during out-of-synchronism conditions, is objectionable, in general, because of insufficient generator-capacity on the power-system at one side of the break, and also because of loss of power to any load which is connected between two or more such breaks or sectionalizing points which may become opened in different line-sections during out-of-synchronism conditions.

Although this phenomenon has been recognized for some time, and various blocking schemes have been proposed and utilized for preventing unwanted circuit-interrupting operations during out-of-synchronism conditions, it has been generaly accepted that, when high-speed relays are involved, as in all modern relaying systems where out-of-synchronism conditions present any problem at all, it is necessary to utilize carrier-current or pilot-wire protective means for giving a simultaneous control of the relays at both ends of a protected line-section, in order to discriminate between a fault and an out-of-synchronism condition.

My present invention is directed to a simple and reliable means whereby tripping during out-of-synchronism conditions may be prevented, with no delay or interruption in the normal fault-responsive tripping functions, except for certain faults which occur after there has been a positive indication that an out-of-synchronism cycle is actually in progress.

A more specific object of my invention is to secure a positive indication of an out-of-synchronism condition by means of a time-delayed response to a non-directional third-zone impedance element, which is not accompanied by a substantially simultaneous actuation of a second-zone impedance element, or an actuation of the second-zone non-directional impedance element within the aforesaid time-delay in the response to the third-zone actuation. The impedance elements may be responsive either to symmetrical or unsymmetrical phase-faults on the protected line-section.

A more specific object of my invention is to utilize a response of a third-zone non-directional impedance element, followed, after more than a predetermined time-delay, by a response of a second-zone non-directional impedance element, as a positive indication of the existence of an out-of-synchronism condition of a certain predetermined severity, that is, a severity sufficient to cause the actuation of the second-zone impedance elements.

A still further object of my invention is to obtain an out-of-synchronism indication with the aid of two auxiliary non-directional impedance elements in addition to the usual first-zone and second-zone fault-responsive relays, or the usual first-zone, second-zone and third-zone fault-responsive relays.

A still further object of my invention is to coordinate the out-of-synchronism protection or detection with the ordinary phase-fault protective relays, so as to prevent unwanted relaying operations during out-of-synchronism conditions.

With the foregoing and other objects in view, my invention consists in the combinations, systems, methods, circuits and apparatus hereinafter described and claimed, and illustrated in the accompanying drawings, wherein:

Fig. 3 is a simplified "across-the-line" diagram of the direct-current connections of a slightly modified system in which the tripping circuits are caused to pass through the directional-element contacts before passing through the impedance-element contacts, and in which single-phase impedance-responses are utilized to obtain the out-of-synchronism indication and control; and Figs. 4, 5 and 6 are similar views illustrating still further modifications.

Figure 1:
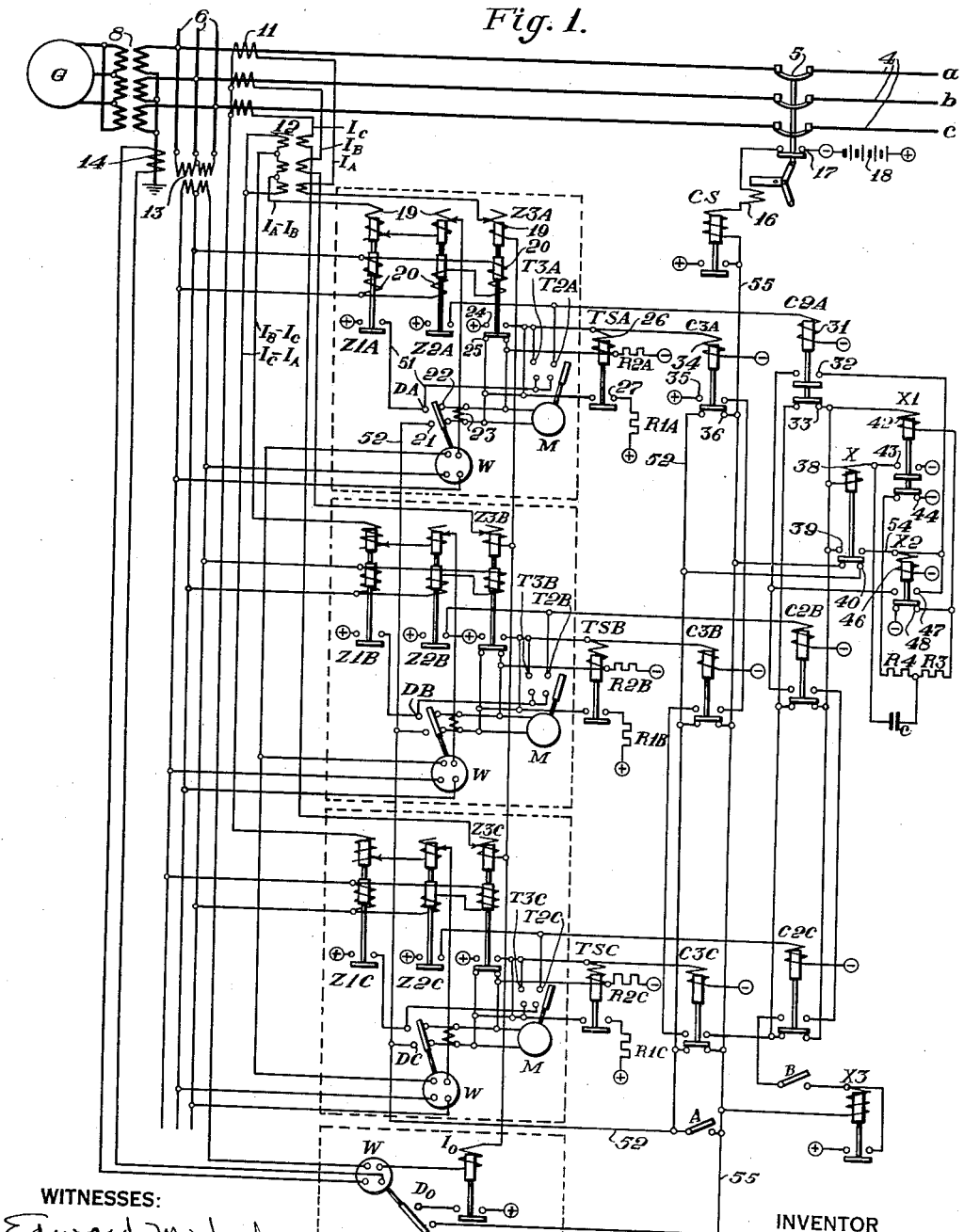
Figure 1 is a simplified diagrammatic view of circuits and apparatus illustrating my invention in a preferred form of embodiment, with the electromagnetic relays illustrated in their deenergized positions, features which are unnecessary to an understanding of my invention being omitted for the sake of clearness.

In Figure 1, I illustrate my invention as being applied to the protection of one end of a three-phase transmission line-section 4, the three phase-conductors being distinguished by the letters a, b and c. The line-section 4 is connected, through a circuit breaker 5, to a bus 6, which is energized, through delta-star step-up transformers 8, from a generator or generators G. Energy for the various relaying apparatus is obtained by means of a bank of line-current transformers 11 which produce the relaying currents $I_A$, $I_B$ and $I_C$, corresponding to the three line-phases; a bank of auxiliary current transformers 12 which produce the relaying currents ($I_A - I_B$), ($I_B - I_C$) and ($I_C - I_A$); a bank of potential transformers 13 for supplying the relaying voltages; and an auxiliary current-transformer 14 connected in the grounded neutral of the line-connected star-side of the power transformers 8, for obtaining a convenient source of reference-current for determining the direction of the residual line-currents, as will be subsequently described.

The circuit breaker 5 is provided with a trip coil 16 which is energized, in accordance with my protective relaying means, through an auxiliary circuit-breaker contact 17, and a direct-current source symbolized by a battery 18, the terminals of which are indicated by (+) and (−).

My invention is illustrated as being applied to a relaying system utilizing three phase-fault relays in each phase, said relays being of increasing sensitivities corresponding to what is known as "first-zone," "second-zone," and "third-zone" operation, the different zones being indicated by the numerals 1, 2 and 3, and the different phases being distinguished by the letters A, B and C, so that the nine quick-acting non-directional impedance relays are designated Z1A, Z2A, Z3A, Z1B, Z2B, Z3B, Z1C, Z2C and Z3C. Each impedance-relay element consists of a current-responsive operating coil 19 and a voltage-responsive restraining coil 20, suitably energized, in any desired manner, so as to be responsive to the line-impedance. The particular manner of energization, illustrated in the drawings is that which is shown in a Harder Patent No. 2,144,494, granted January 17, 1939, and assigned to the Westinghouse Electric & Manufacturing Company. I wish it to be understood, however, that any desired phase-current line-impedance response may be utilized.

A group of three impedance relays for each of the line-phases is associated with a quick-acting directional relay element which is indicated schematically in the drawings as a simple wattmeter element W. Each directional element W is provided with a make-contact 21 and a break-contact 22, the make-contacts for the different phases being utilized as the directional relay elements DA, DB and DC, respectively.

Each group of phase-fault relays is provided with a timing motor M. The timing motors M have second-zone and third-zone timer contacts T2A, T3A, T2B, T3B, T2C, T3C. The timer motors M are illustrated as being energized by auxiliary current-transformers 23, from the currents ($I_A - I_B$), ($I_B - I_C$) and ($I_C - I_A$), respectively. The current-transformers 23 are normally short-circuited, respectively, by the back contacts 22 of the respective directional elements W. The second-zone timer-contacts T2A, T2B and T2C are designed to provide a time-delay which is sufficient, in general, for the completion of a circuit-interrupting operation by a first-zone relaying means at a point closer to the fault, and the third-zone timer contacts T3A, T3B and T3C are arranged to provide a time-delay which is sufficient, in general, for the completion of a circuit-interrupting operation by a second-zone relaying-means at a point closer to the fault.

The third-zone impedance elements Z3A, Z3B and Z3C are each provided with a make-contact 24 and a break-contact 25. Although normally more elaborate control-means for the timer-motors M will be utilized, as shown in the Harder Patent No. 2,144,494, I have shown this control, for simplicity of illustration, as being effected by the back-contacts 25 of the respective third-zone impedance elements Z3A, Z3B and Z3C, which short-circuit the respective timer-motors M, as shown in Fig. 1.

The three phase-fault panels of relaying elements have associated with them, three instantaneous auxiliary relays TSA, TSB and TSC, each of which has an operating coil 26 and a make-contact 27; three instantaneous auxiliary relays C2A, C2B and C2C, each of which has an operating coil 31, a make-contact 32, and a break-contact 33; and also three instantaneous auxiliary relays C3A, C3B and C3C, each of which has an actuating coil 34, a make-contact 35 and a break-contact 36.

The third-zone impedance element make-contacts 24 are utilized to energize the coils 26 and 34 of the respective auxiliary relays TSA, C3A; TSB, C3B; and TSC, C3C, the respective operating coils 26 of the relays TSA, TSB and TSC being also connected in series with resistors R2A, R2B and R2C respectively. The relays TSA, TSB and TSC are utilized to respond whenever their corresponding impedance elements Z3A, Z3B and Z3C respond, thereupon closing the auxiliary relay contacts 27, which establish a bypass circuit including a resistance R1A, R1B or R1C, as the case may be, bypassing the make-contacts 24 of the respective impedance elements Z3A, Z3B and Z3C. The impedance-element break-contacts 25 are utilized to short-circuit the operating coils 26 of the respective auxiliary relays TSA, TSB and TSC, causing the latter to drop out when the respective third-zone impedance relays Z3A, Z3B and Z3C drop out.

The second-zone impedance-relay make-contacts Z2A, Z2B and Z2C are utilized to energize the respective coils 31 of the auxiliary relays C2A, C2B and C2C, respectively.

In accordance with my invention, I also provide, to serve all three phase-fault relaying panels, a single instantaneous auxiliary relay X having an operating coil 38, a make-contact 39 and a break-contact 40, a second instantaneous auxiliary relay X1 having an operating coil 42, a make-contact 43 and a break-contact 44, and a third instantaneous auxiliary relay X2 having an operating coil 46, a make-contact 47 and a break-contact 48.

Figure 2:
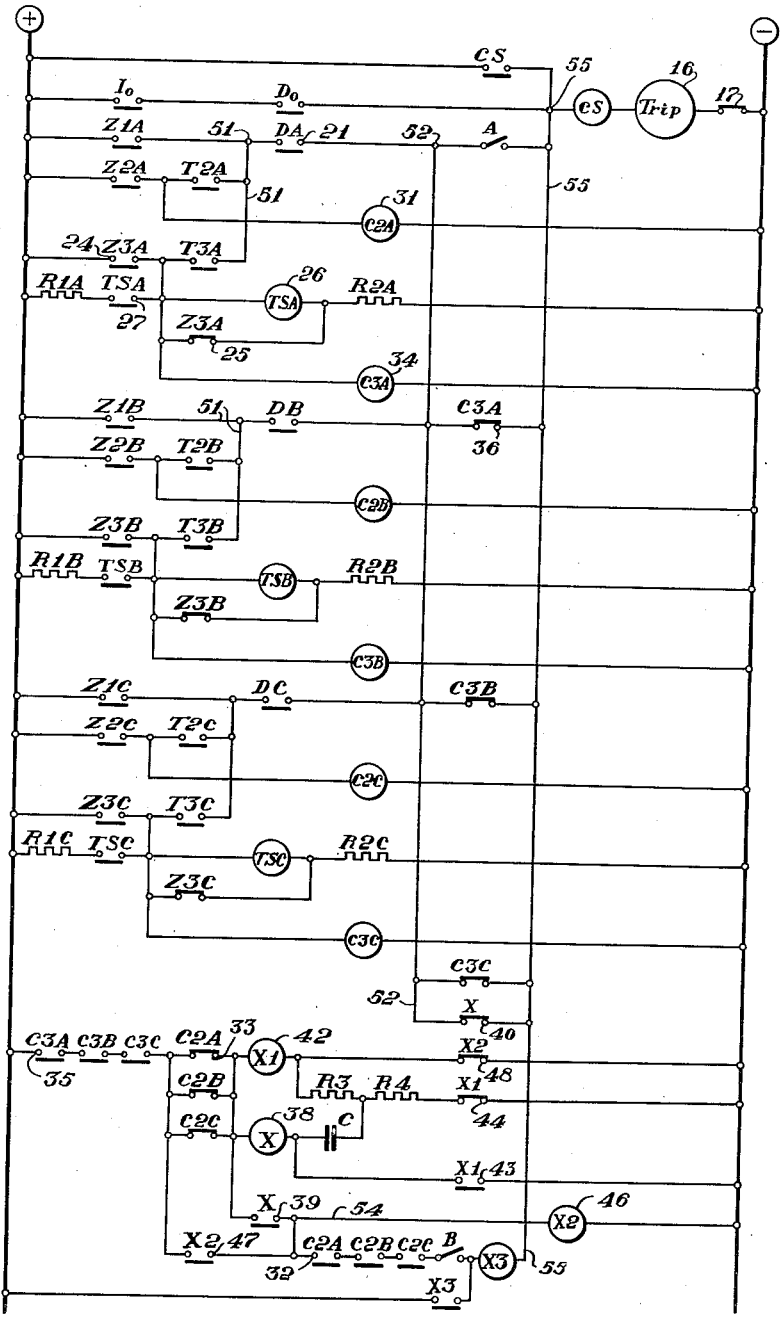
Fig. 2 is a so-called "across-the-line" diagram of the direct-current connections of said relaying system.

The phase-fault tripping contacts of the embodiment of my invention which is shown in Figs. 1 and 2 are the same for each of the three phases, so that a description of one will suffice for all. Referring to the phase-A panel, it will be observed that two auxiliary relaying buses 51 and 52 are utilized. The auxiliary bus 51 is energized instantaneously by the closure of the first-zone impedance contacts Z1A; it is energized, with a second-zone time-delay, in response to the closure of the second-zone impedance contact Z2A and the second-zone timer contact T2A; and it is energized, with a third-zone time-delay, by the closure of the third-zone impedance contact Z3A, marked 24, and the closure of the third-zone timer contact T3A. It will be noted that there are three auxiliary relaying buses 51, one for each of the phase-fault panels, while there is but a single auxiliary relaying bus 52, which is common to all three of the phase-fault panels. The respective auxiliary buses 51 are connected to the common auxiliary bus 52 through the directional-relay contacts 21 of the respective directional relays DA, DB and DC.

In accordance with my invention, the three make-contacts 35 of the auxiliary relays C3A, C3B and C3C are connected in series with each other, and in series with the three parallel-connected break-contacts 33 of the relays C2A, C2B and C2C, to energize the coils 38 and 42 of the auxiliary relays X and X1. The circuit for the X1 coil 42 is normally completed by the back contact 48 of the X2 relay, and this back contact 48 is bypassed by two resistors R3 and R4 and the back contact 44 of the auxiliary relay X1, all connected in series with each other and in shunt to the back contact 48 of the relay X2. The energizing circuit of the X-relay coil 38 is normally not completed by the closure of the C3 contacts 35, because of the series connection of the make-contact 43 of the X1 relay. The circuit of the X-coil 38 is also susceptible of being completed through a capacitor C, the resistor R4 and the back contact 44 of the X1 relay.

Another circuit is provided, through the aforesaid serially connected contacts 35, and parallel-connected contacts 33, to the make-contact 39 of the relay X, which is utilized to energize a circuit 54 which energizes the operating coil 46 of the relay X2. The make-contact 47 of the relay X2 is utilized to provide a holding circuit through the three serially connected contacts 35 and the aforesaid contact 47, to the circuit 54.

In accordance with my invention, a tripping bus 55 is provided, which is serially connected to the auxiliary bus 52, by a group of four parallel-connected back contacts, said group comprising the back contacts 36 of the three auxiliary relays C3A, C3B and C3C, and the back contact 40 of the auxiliary relay X. These four back contacts provide the out-of-synchronism protection in accordance with this embodiment of my invention. These four back contacts can be bypassed, if desired, by the closure of a normally open, manually controlled switch A, which, when closed, will bypass the out-of-synchronism protective features, producing normal relaying without any out-of-synchronism protection.

In the particular form of embodiment of my invention shown in Figs. 1 and 2, I also provide for ground-fault protection in the form of a ground overcurrent relay I₀ which is energized from the neutral circuit of the line-current transformers 11, and a ground-fault directional element D₀ which normally compares the directions of the neutral current of the line-current transformers 11 and the neutral current of the power-transformers 8, as supplied by the auxiliary current transformer 14. The contacts of the ground overcurrent and directional relays I₀ and D₀ are connected in series, to energize the tripping bus 55.

In the form of embodiment of my invention shown in Figs. 1 and 2, I also provide means whereby I may provide for positive tripping, in response to an out-of-synchronism condition, or in response to an incipient out-of-synchronism condition. To this end, I utilize the circuit 54 to energize an auxiliary trip-circuit through the three serially connected make-contacts 32 of the auxiliary relays C2A, C2B and C2C, a manually controlled switch B, and the operating coil of an auxiliary relay X3 which has a make-contact for sealing itself in, and thence to the tripping circuit 55. When the switch B is closed, an out-of-synchronism condition is utilized to positively produce tripping, whereas, when the switch B is open, the out-of-synchronism condition will not produce tripping. This enables the system-operator to choose the particular sub-station at which he wishes to effect a break between two portions of a power system which are falling out of synchronism with each other, so that the break between the two portions of the system may be made at a point where there is adequate generating capacity on both sides of the break to insure continuity of service.

The operation of the form of my invention shown in Figs. 1 and 2 may be described as follows.

An out-of-synchronism condition will result, in general, in the actuation of all three of the sensitive, or third-zone, impedance elements Z3A, Z3B and Z3C, at some time or times during the out-of-synchronism cycle or cycles. I refer to the line-conditions which result in the actuation of the corresponding impedance elements in all three phases, as line-conditions corresponding to an approximately symmetrical polyphase fault, by which expression I mean that the fault-indication is sufficiently symmetrical to actuate the corresponding impedance elements of all three phases of the line. It will be noted that the impedance relay-elements are all non-directional in their responses, so that the operation of the embodiment of my out-of-synchronism response which is shown in Figs. 1 and 2 is not made contingent upon any directional response, such as the directional elements DA, DB or DC, which cannot be relied upon to close promptly during out-of-synchronism conditions, and is also not contingent upon a receiver-relay contact such as is shown at 58 in the Harder Patent No. 2,144,494, which necessitates costly carrier-current equipment, and which also involves directional responses in the control of the carrier-current equipment.

A significant feature about the progress of an out-of-synchronism cycle is that the polyphase line current, which has the same instantaneous values at all of the relaying points in the affected line, steadily increases until about the midpoint of the out-of-synchronism cycle, and then decreases again, while the phases of the line-voltages undergo alterations, in different amounts at the different relaying points along the line, as the voltages at one end of the line advance through 360° with respect to the voltages at the other end of the line. At the same time, the magnitudes of the line-voltages, at the different relaying points along the line, suffer a change, diminishing to a minimum at approximately the 180° point of the out-of-synchronism cycle, and then being restored again as the two ends of the line reapproach synchronism after having slipped a pole. The severity of this voltage-dip, at about the mid-point of the out-of-synchronism cycle, depends upon the location of the relaying-point, the voltage becoming the least at the so-called electrical center of the interconnection between the generating systems which are falling out of synchronism with each other. The foregoing phenomena are relatively slow in their progress, requiring something like a second, or 60 cycles in an ordinary 60-cycle system, more or less, to complete a 360° slip-cycle, the duration of the slip-cycle being dependent upon the particular system operating conditions.

It will be apparent, from the foregoing very brief explanation, that the most sensitive, or third-zone, impedance elements Z3A, Z3B and Z3C, will be the first impedance elements to be actuated, at any given relaying location, during the progress of an out-of-synchronism cycle. There will inevitably be a certain amount of delay, after the operation of the third-zone impedance elements, before either the first-zone or second-zone impedance elements will be actuated, during the progress of an out-of-step cycle, if these first-zone and second-zone impedance elements are operated at all during the out-of-synchronism cycle. In most transmission systems, this delay, after the operation of the third-zone impedance elements will be longer than five cycles or $1/12$ of a second.

In accordance with my invention, as embodied in Figs. 1 and 2, I take advantage of the following distinction between three-phase faults and out-of-synchronism conditions, namely, that a three-phase fault within second-zone distance from the relaying point will practically simultaneously operate all of the second-zone impedance relays Z2A, Z2B and Z2C, and all of the third-zone impedance relays Z3A, Z3B and Z3C, whereas, in the case of an out-of-synchronism condition, the second-zone impedance elements will not operate, if they operate at all, for at least five cycles after the actuation of the third-zone impedance elements. I detect an out-of-synchronism condition, therefore, by obtaining a slightly time-delayed or time-hesitation response to the actuation of all three of the third-zone impedance elements Z3A, Z3B and Z3C, delaying the response to said operation for five cycles, or other suitable time, and I then observe whether the second-zone impedance elements have operated by that time, and if not, I take such circumstance as an indication of the presence of an out-of-synchronism condition. This will be a correct indication, except in the event of a three-phase fault, or an approximately symmetrical polyphase fault, at a distance further than the second-zone relaying distance from the relaying point, in which case, the second-zone impedance elements would not pick up, thereby indicating the presence of an out-of-synchronism condition when no such condition exists. As I utilize the aforesaid indication of an out-of-synchronism condition simply to block tripping for a time, and as the fault is beyond the second-zone impedance-relay operation, anyway, there would be no tripping, in any event, even without the out-of-synchronism blocking, except in response to the third-zone impedance elements, which are associated with a long, third-zone timer T3A, T3B, T3C, which introduces a time delay of about the same order of magnitude as the duration of the out-of-synchronism cycle, and which may, or may not, be blocked by the out-of-synchronism indication. As will subsequently be pointed out, the third-zone impedance-tripping operation is blocked by the out-of-synchronism indication in the particular embodiment of my invention shown in Figs. 1 and 2.

Assuming, for the moment, that all three of the third-zone impedance relays Z3A, Z3B and Z3C are actuated, in the system shown in Figs. 1 and 2, in response to an out-of-synchronism condition, the Z3 relays close, energizing the C3 relays, and at the same time energizing the TS relays. In a certain time, ranging from a fraction of a cycle to several cycles,—let us say, in two cycles, the TS and C3 relays pick up. The TS relays will complete a holding circuit, through their contacts 27, around the make-contacts 24 of the Z3 relays. The C3 relays will energize the X1 relay through the three serially connected make-contacts 35 of the C3 relays, the three parallel-connected break-contacts 33 of the C2 relays, and the break-contact 48 of the X2 relay. At the same time, the three parallel-connected break-contacts 36 of the C3 relays open, in the trip-circuit between the auxiliary relaying bus 52 and the tripping bus 55. At the same time, the capacitor C begins to charge slowly, in what I shall call the positive direction, through the coil 38 of the X relay, and through the resistors R3 and R4 in parallel, but this charging current is not sufficient to pick up the X relay.

In two cycles more, or let us say, in four cycles after the actuation of the third-zone impedance elements Z3, the relay X1 picks up, energizing the X-relay coil 38 through the make-contact 43 of the X1 relay. At the same time the capacitor C begins to lose its partially acquired positive charge through the resistor R3 serving as a discharging resistor.

Let us assume that, in one cycle more, or in five cycles after the actuation of the Z3 relays, the X relay picks up. This immediately opens the break-contact 40 of the X relay, in the tripping circuit between the auxiliary relaying bus 52 and the tripping bus 55. This is the last of the four parallel connected back-contacts 36 and 40 in the tripping circuit, so that the trip-circuit is now open, five cycles after the actuation of the third-zone impedance elements Z3A, Z3B and Z3C, making it impossible thereafter to effect a tripping or line-sectionalizing operation of the circuit breaker 5 in Fig. 1, so long as the four back-contacts 36 and 40 remain open.

This time-delay of five cycles is sufficiently long, so that, if the third-zone impedance elements Z3 had operated as a result of a three-phase fault within the second-zone distance, the instantaneously operating second-zone impedance relays Z2 would have had much more than ample time to operate, in which case they would have energized the auxiliary relays C2, resulting in the opening of the back-contacts 33 in the energizing circuits of the X1 and X relays, so that the X relay would not become actuated, in such an event, and hence the trip-circuit would have remained complete, through the back-contact 40 of the X relay. If the third-zone impedance elements Z3 had actuated in response to a three-phase fault in the first-zone distance, the Z1 impedance elements would have actuated, thereby resulting in instantaneous tripping within about one cycle, provided that the distance relays DA, DB and DC indicated the so-called "internal" direction of the fault-current, or direction from the bus 6 into the protected line-section 4.

Continuing the chain of operations initiated by the actuation of the X relay, which is assumed to have occurred in five cycles after the actuation of the Z3 relays, unaccompanied by an actuation of the Z2 relays, it will be observed that the X relay energizes the operating coil 46 of the X2 relay, through the make-contact 39 of the X relay. The X2 relay promptly picks up, say in one cycle more, and seals itself in, through its make-contact 47, at the same time opening its break-contact 48 in the energizing circuit of the X1 relay. The capacitor C then starts to charge in what I call the negative direction, through the operating coil 42 of the X1 relay, the resistor R3, and the make-contact 43 of the X1 relay, drawing enough current to keep the X1 relay closed for a certain time.

If there is an out-of-synchronism condition in progress, and if the relaying point is sufficiently close to the electrical center of the interconnection between the two portions of the transmission system which are swinging out of step with each other, we may assume that the second-zone impedance relays Z2 will pick up, in some 10 or 20 cycles, or more, after the actuation of the third-zone impedance elements Z3. Within, say, a cycle later, the C2 relays would pick up, closing their three serially connected make-contacts 32, which would directly energize the tripping circuit 55, through the switch B, provided that the switch B were closed, it being noted that the C2 relay back-contacts 33 are bypassed by the X2-relay make-contact 47. It is contemplated that the switch B will be open, at all relaying points along the interconnected line, except possibly one point, which may be changed, from time to time, by the system-operator, in acordance with the generator-capacity and loads which are connected to the system at the two ends of the interconnected lines, so that, in the event of an out-of-synchronism condition, the two halves or portions of the system will be broken apart from each other at the point which will cause the least disturbance to the system.

Assuming now, that the switch B is open, so that the actuation of the C2 relays does not result in a tripping operation, any one of several different things may next happen, in a time-range which may be visualized, by way of example, as lying within the range of twenty-four to thirty-five cycles, more or less, after the initial actuation of the third-zone impedance elements. The actuation of the third-zone impedance elements may result in the initiation of the actuation of the timer motors M (Fig. 1) at some of the relaying locations where the current-direction was such as to cause an actuation of the directional relays DA, DB and DC. In a certain time, such as twenty-four cycles, more or less, after the initiation of the operation of the timer motors M, according to the particular setting of the timing mechanism, the second-zone timer-contacts T2A, T2B and T2C would close, thereby energizing the auxiliary relaying buses 51, and, through the contacts 21 of the directional element, also energizing the auxiliary relaying bus 52, but a tripping operation would not result because of the four open back-contacts 36 and 40. During this portion of the out-of-synchronism cycle, or possibly a little later, first the Z1 relays, and then the Z2 relays will drop out, leaving only the Z3 relays still energized, as the out-of-synchronism cycle progresses on beyond its midpoint.

At a certain time after the opening of the X2 back-contact 48, which time we may visualize as thirty-five cycles, more or less, after the initial actuation of the Z3 relays, the charging current of the negatively charging capacitor C will fall off sufficiently to let the relay X1 drop out, opening the X-relay energizing circuit at the X1 make-contact 43, and starting the capacitor charging, in what I call the positive direction, through the X-coil 38, the resistor R4, and the X1 break-contact 44, drawing enough charging current to keep the X-coil 38 energized for a time.

Before the X-relay returns to its non-actuated position, the out-of-synchronism cycle must have progressed sufficiently far to cause the Z3 impedance elements to drop out, and the design of the capacitor C and the resistors R3 and R4 must be such, in relation to the operating-currents of the relays X and X1, so that the necessary time-delay will be obtained, in the deenergization of the X relay. To fix our ideas, it may be assumed that the Z3 relays return to their non-actuated position in from forty-five to fifty cycles, more or less, after their initial actuation during the early portion of the out-of-synchronism cycle. When the Z3 relays return to their non-actuated positions, they deenergize the TS relays, the C3 relays, the X2 relay and the X relay. The deenergization of the C3 relays and of the X relay results in the reclosure of the back-contacts 36 and 40 in the tripping circuit, thereby making it possible for normal tripping functions to occur again.

In order to provide a sufficient factor of safety, it may be assumed that, if the Z3 relays had not dropped out again, the charging current of the positively charging capacitor, charging through the X-coil 38, the resistor R4, and the back-contact 44, would be sufficient to keep the X-coil energized until, say, sixty-five cycles after the initial energization of the Z3 relays, this time being chosen so as to be longer than the maximum expectable time before the release of the Z3 impedance elements during any expectable out-of-synchronism condition on the particular system on which the relays are applied.

The time-delay introduced by the third-zone timer-contacts T3A, T3B and T3C, at relaying points where the current-direction is "internal," may be more, or less, than the time-setting, as sixty-five cycles, of the out-of-synchronism mechanism. In the particular system illustrated in Figs. 1 and 2, it may be assumed that the T3 time is of the order of one hundred to one hundred twenty cycles, or two seconds, after the initial operation of the Z3 element at a relaying station where the current-direction is "internal."

When tripping occurs, in the system shown in Figs. 1 and 2, it occurs by the energization of the tripping bus 55, from which a tripping circuit is continued, through the operating coil of a contactor switch CS, the trip coil 16 of the circuit breaker 5, and the auxiliary contact 17 on the circuit breaker 5, in a manner which is well understood in the art. The contactor switch CS is provided with a make-contact which closes a holding circuit for directly energizing the tripping bus 55, thereby preventing burning of the sensitive relay-contacts.

It will be noted that the back-contact 40 of the X-relay does not open, in response to an out-of-synchronism condition, until a quick-acting first-zone tripping operation has been completed, in the event that the out-of-synchronism condition is caused by a fault in the first-zone area. Also, faults of a type other than polyphase phase-to-phase faults, for example, ground-faults, are never blocked by the out-of-synchronism contact 40, as will be seen from the direct tripping circuit through the contacts of the ground-overcurrent relay $I_0$ and the ground-directional relay $D_0$.

In the event of an unsymmetrical or non-polyphase phase-fault occurring after an out-of-synchronism cycle has started, it will be noted that the back-contacts 36 of the C3-relays corresponding to the unfaulted phase or phases will promptly reclose when the out-of-synchronism line-conditions no longer correspond to a third-zone impedance-condition at a certain point in the second half of the out-of-synchronism cycle, thereby discontinuing the out-of-synchronism indication or blocking which is provided by a simultaneous open condition of all four of the back-contacts 36 and 40 of the relays C3A, C3B, C3C and X. It is thereupon immediately possible for a tripping operation to occur through either a quick-acting directional first-zone impedance-responsive tripping-channel such as Z1A—DA, or a time-delayed directional second-zone or third-zone impedance-responsive tripping-channel such as Z2A—T2A—DA or Z3A—T3A—DA. It is desirable, to this end, that the timer-contacts T2 and T3, when once closed, shall remain closed until the fault-condition is cleared.

In Fig. 3, I show a modification of the relaying system which is shown in Fig. 2. By way of illustrating some of the possible modifications, or modified forms which the relays may take, I show, in Fig. 3, a system in which the normal tripping circuits pass first through the respective directional-relay contacts DA, DB and DC, before passing on to the impedance-relay contacts, thereby avoiding the necessity for the auxiliary relaying buses 51 in Fig. 2. It will be noted, in Fig. 3, that the trip-circuit contacts of the second and third-zone impedance elements are directionally responsive, by reason of the series connection of the respective directional elements DA, DB and DC, although the impedance elements themselves are non-directional in their response. In order to obtain a non-directional second and third-zone impedance-response, in Fig. 3, I have illustrated the second and third-zone impedance relays, Z2C and Z3C, in phase-C, as being provided with additional or auxiliary contacts 56 and 57, which are utilized to energize the operating coils 31' and 34' of the auxiliary relays C2 and C3, respectively.

It will thus be noted that, in Fig. 3, I utilize single-phase responses of the second and third-zone impedance elements, rather than a three-phase response thereof as in Fig. 2. This has the advantage of simplicity, while introducing only a slight handicap, namely, that if a single-phase fault, on the relaying phase C, should grow into, or produce, an out-of-synchronism condition, as a result of a single-phase fault within the second-zone relaying-distance from the relaying point, an out-of-synchronism indication would not be obtained, because of the actuation of the second-zone impedance element Z2C at the same time as the third-zone impedance element Z3C. However, with quick clearing of faults, as in all of the systems embodying my invention in its illustrated forms of embodiment, a single-phase fault should be cleared before there is any real possibility of producing an out-of-synchronism condition, so that the above-mentioned handicap is not at all serious, being practically non-existent.

In the relaying system shown in Fig. 3, there is but one C2 relay, having a make-contact 32' and a break-contact 33', and there is also but one C3 relay, having a make-contact 35' and a break-contact 36'. Otherwise the out-of-synchronism connections and control are the same as in Fig. 2, which has been fully described.

In Fig. 4 I show a further modification of my invention. In this figure, the normal tripping circuits are illustrated as passing first through the impedance elements, before passing through the respective directional-relay contacts DA, DB and DC, as in Fig. 2. Instead, however, of the group of auxiliary relays C2A, C2B, C2C, C3A, C3B, C3C, X, X1 and X2, the resistors R3 and R4 and the capacitor C, as in Fig. 2, I make use, in Fig. 4, of two instantaneous auxiliary relays X4 and X5, and a retarded or time-delay auxiliary relay X6. The auxiliary relay X4 has an operating coil 60 and two break-contacts 61 and 62. The auxiliary relay X5 has an operating coil 63 and three make-contacts 64, 65 and 66. The auxiliary relay X6 has an operating coil 67, a time-delay mechanism which is illustrated in the form of a short-circuited slug or ring 68, and two make-contacts 69 and 70.

The X4 coil 60, in Fig. 4, is energized from an auxiliary relaying bus 71 which is energized in response to the energization of any one of the first-zone impedance elements Z1A, Z1B or Z1C, or any one of the second-zone impedance elements Z2A, Z2B or Z2C. In order to avoid the use of extra contacts on the impedance elements, or extra operating coils on the X4 relay, while, at the same time, avoiding so-called "sneak" circuits back, from the bus 71, from one of the impedance elements to another, I utilize one-way current-conductors or rectifiers 72 and 73 in the connections between the bus 71 and the first-zone and second-zone impedance-relay contacts, respectively, so that current can flow, in only one way, from the respective impedance-relay contacts, towards the auxiliary relaying bus 71.

In Fig. 4, the auxiliary X6 relay is normally energized, through the break-contact 61 of the X4 relay and a resistor R6, the X4 break-contact 61 being bypassed by the make-contact 69 of the X6 relay. Since the X6 relay is normally energized, the operating coil 63 of the X5 relay is also normally energized, through the make-contact 70 of the X6 relay. Consequently the X5 make-contacts 64, 65 and 66 are normally closed.

These make-contacts 64, 65 and 66 of the auxiliary relays X5 are utilized as the out-of-synchronism blocking-means in the modification shown in Fig. 4. In contrast to the systems shown in Figs. 2 and 3, these out-of-synchronism blocking contacts of Fig. 4 are included only in series with the normal tripping circuits through the first and second-zone impedance elements Z1A, Z1B, Z1C, and Z2A, Z2B, Z2C, the second-zone tripping circuits also including the timer contacts T2A, T2B and T2C, respectively. Three out-of-synchronism blocking contacts 64, 65 and 66 are utilized, in order to provide a separate blocking contact for each of the phase-relay panels. It will be understood that these three out-of-synchronism blocking contacts 64, 65 and 66 are normally closed, because of the normal energization of the X5 relay.

Upon the occurrence of an out-of-synchronism condition, in the system shown in Fig. 4, the first thing to happen is the actuation of the three third-zone impedance elements Z3A, Z3B and Z3C, which are provided with special extra contacts 77, 78 and 79 which are connected in series with each other, and in series with the break-contact 62 of the X4 relay, in a shunting circuit which is connected in parallel to the X6 operating coil 67 and its serially connected contacts 61 and 69. When all three of the third-zone impedance elements are actuated, therefore, the X6 operating coil 67 is short-circuited, causing the relay X6 to drop out after a time-delay which is caused by its short-circuited coil or winding 68. This time-delay may be of the order of five cycles, as previously explained in connection with Fig. 2.

Let us assume, therefore, that, at the end of five cycles, the auxiliary relay X6, in Fig. 4, drops out. This immediately deenergizes the X5 relay, causing the out-of-synchronism blocking contacts 64, 65 and 66 to open, thereafter preventing tripping as a result of the instantaneous first-zone directional impedance response Z1A—DA, Z1B—DB or Z1C—DC, or the time-delayed second-zone directional impedance response Z2A—T2A—DA, Z2B—T2B—DB, or Z2C—T2C—DC, without having any effect upon the so-called "back-up" tripping circuits Z3A—T3A—DA, Z3B—T3B—DB or Z3C—T3C—DC. As in the other modifications, the above-mentioned time delay of five cycles, which is produced, in Fig. 4, by the slow drop-out operation of the X6 relay, affords ample time for the completion of a response to the second-zone impedance elements Z2A, Z2B or Z2C, any one of which, if actuated within said five-cycle period, instantly energizes the X4 relay, opening the break-contact 62 and thus breaking the short-circuiting circuit around the operating coil 67 of the X6 relay, preventing the latter from dropping out, before its flux decreases to a point which would permit a dropping-out operation.

The Fig. 4 system introduces two differences in operation, however, namely, that the out-of-synchronism blocking operation is interrupted, before the completion of the aforesaid five-cycle interval, in response to an actuation of either a first-zone impedance element Z1A, Z1B or Z1C, or a second-zone impedance element Z2A, Z2B or Z2C; and that the out-of-synchronism operation is interrupted in response to a single-phase response of any first or second-zone impedance element, in any phase, rather than being made responsive to a three-phase second-zone response, as in Fig. 2, or responsive to merely a phase-C second-zone response as in Fig. 3.

In general, if the first and second-zone impedance elements are identical with each other, except for their sensitivity, the second-zone element will always pick up, during an out-of-synchronism cycle, before the first-zone element picks up, but where the first-zone impedance element is of a different type, responding to a different portion or function of the line-impedance than the second-zone impedance element, it may be possible, under some circumstances, for the first-zone impedance element to pick up, during the out-of-synchronism cycle, prior to the second-zone impedance element, so that the additional first-zone response, in energizing the auxiliary relaying bus 71 in Fig. 4, is of some advantage.

In Fig. 4, in order to prevent the possibility of tripping through the third-zone tripping circuits Z3A—T3A—DA, Z3B—T3B—DB or Z3C—T3C—DC, during an out-of-synchronism cycle, it is necessary for the time-delay introduced by the third-zone timers T3A, T3B and T3C to be longer than the period during which the Z3 impedance elements may be energized during the out-of-synchronism cycle.

At some time during the second half of the out-of-synchronism cycle, the impedance relays return to their non-actuated positions, in the order Z1, Z2 and Z3. The deenergization of the first and second-zone impedance-elements Z1 and Z2, in Fig. 4, deenergizes the X4 relay, closing the back-contacts 61 and 62 of the latter. Since the Z3 back-contacts 77, 78 and 79 are still closed, a short-circuiting connection is established around the X6 coil 67, through the contacts 77, 78, 79 and 62, so that the break-contact 61 of the X4 relay cannot reenergize the X6 relay at this time. When subsequently the first one of the third-zone relays Z3A, Z3B or Z3C drops out, in the latter part of the out-of-synchronism cycle, it opens its contact 77, 78 or 79, as the case may be, and removes the short-circuit from the X6 coil 67, permitting it to become reenergized through the X4 contact 61. This restores the relays to their normal positions.

In Fig. 5, I show a still further illustrative form of embodiment of my invention, in which the out-of-synchronism protection is afforded by mechanism which is entirely separate and distinct from the ordinary fault-responsive tripping mechanism, except for the addition of the normally closed out-of-synchronism-responsive contacts. In Fig. 5, I show a system in which the ordinary panels of phase-fault relays are provided, including, as previously described, the directional elements DA, DB and DC, the first, second and third-zone impedance elements for each phase, as indicated at Z1A, Z2A, Z3A, Z1B, Z2B, Z3B, Z1C, Z2C and Z3C, and the second and third-zone timer-contacts for each phase, as indicated at T2A, T3A, T2B, T3B, T2C and T3C.

In addition to the above-mentioned normal fault-responsive relays, I provide, in Fig. 5, two additional instantaneous non-directional impedance elements Z4 and Z5. As previously explained, these impedance elements may be either single-phase or polyphase. The Z4 impedance element should be at least as sensitive as, and preferably more sensitive than, the second-zone impedance elements Z2A, Z2B, and Z2C, while the Z5 impedance element is more sensitive than the Z4 impedance element. The Z4 impedance element is provided with a break-contact 81. The Z5 impedance element is provided with a break-contact 82 and a make-contact 83.

In addition to the two extra impedance elements Z4 and Z5, in Fig. 5, I also provide a single delayed-action auxiliary relay X7 which is illustrated as having an operating coil 84, a short-circuited winding 85, and four make-contacts 86, 87, 88 and 89. The operating coil 84 of the X7 relay is normally energized through the back-contacts 81 and 82 of the impedance elements Z4 and Z5, and a resistor R7, the two back-contacts 81 and 82 being by-passed by the make-contact 86 of the X7 relay. The other three make-contacts 87, 88 and 89 of the auxiliary relay X7 are connected, respectively, in the phase-A, phase-B and phase-C tripping circuits involving the first and second-zone impedance elements, as explained in connection with Fig. 4. These X7 relay-contacts 87, 88 and 89 are utilized as the out-of-synchronism protective contacts, being normally closed because of the normal energization of the X7 relay.

In the event of an out-of-synchronism condition, in the system shown in Fig. 5, the Z5 relay will pick up more than five cycles sooner than the Z4 relay, and when the Z5 relay picks up it will close a short-circuiting circuit around the operating coil 84 of the X7 relay, through the make-contact 83 of the Z5 relay, the break-contact 81 of the Z4 relay, and the make-contact 86 of the previously energized X7 relay. In a matter of five cycles, more or less, if the short-circuiting circuit around the X7 coil 84 exists that long, the X7 relay will drop out, opening the first and second-zone trip-circuit contacts 87, 88 and 89, as has been previously explained in connection with the other figures.

In the event of a fault within the reach of the Z4 impedance element, in Fig. 5, the Z4 impedance element will operate at the same time as the Z5 impedance element, opening the Z4 break-contact 81 and preventing the short-circuiting of the X7 relay. In the event of a fault beyond the reach of the Z4 impedance element, but within the reach of the Z5 impedance element, an out-of-synchronism indication will be obtained, opening the first and second zone trip-circuit contacts 87, 88 and 89, but since the Z4 impedance element does not respond, neither can the first and second-zone impedance elements respond, because the Z4 element is more sensitive than the second-zone elements, so that the opening of the blocking contacts 87, 88 and 89 can have no deleterious effect.

In the preferred forms of my out-of-synchronism-responsive relaying-means, which are absolutely non-directional in their operation, it will be apparent that a single out-of-synchronism relaying mechanism may be utilized to suffice for an extension of the line 4 on the other side of the bus 6, Fig. 1, in the case of relaying stations which are located at some intermediate point in the interconnection line 4. It is not necessary to duplicate the out-of-synchronism equipment for the line-sections on both sides of the station-bus 6.

In Fig. 6, I have illustrated only that portion of the tripping circuit which is designed to produce a definite tripping-operation in response to an out-of-synchronism condition, in a further embodiment of my invention in which the out-of-synchronism indication is provided by a sequential response of the third-zone, second-zone and first-zone impedance-elements, in the order named. This is a modification of the tripping circuits which are provided, in Figs. 2 and 3, when the switch B of said figures is closed.

In Fig. 6, I provide one or more of the first-zone impedance-elements, such as Z1C, with an extra make-contact 91; the second-zone impedance-element Z2C is provided with an extra make-contact 92 and a break-contact 93; and the third-zone impedance-element Z3C is provided with an extra make-contact 94 and a break-contact 95. I also provide a delayed-action auxiliary relay X8 which is illustrated as having an operating coil 96, a short-circuited winding 97, a make-contact 98, and a break-contact 99. I further provide, in Fig. 6, an instantaneous auxiliary relay Y having an operating coil 101, a make-contact 102, and a break-contact 103.

In Fig. 6, the operating coil 96 of the X8 relay is normally energized through the back-contacts 93 and 95 of the impedance-elements Z2C and Z3C, and also through a resistor R8, the two back-contacts 93 and 95 being bypassed by the make-contact 98 of the X8 relay, similar to the arrangement shown in Fig. 5. When the third-zone impedance-element Z3C responds, without a response of the second-zone element Z2C, the Z3C make-contact 94 short-circuits the coil of the auxiliary relay X8, and causes said relay to drop out after a predetermined time-delay of 4 or 5 cycles, closing its back-contact 99. If, after this predetermined time-delay, the second-zone impedance-element Z2C responds, the closure of the Z2C make-contact 92, which is in series with the X8 back-contact 99, energizes the coil 101 of the Y relay through a resistor R9.

In Fig. 6, the energization of the Y relay is utilized to close the make-contact 102 which energizes the tripping-circuit 55 in series with the make-contact 91 of the first-zone impedance-element Z1C. Connections are provided, however, so that the operating coil 101 of the Y relay is short-circuited, by the Z1C make-contact 91 in series with the Y break-contact 103, if the Z1C relay should respond before the energization of the Y relay. By this means, it becomes impossible to energize the Y relay unless the second-zone impedance-responsive contact 92 closes before the first-zone impedance-responsive contact 91, thus making sure that an out-of-synchronism tripping-operation is not obtained, through the serially-connected contacts 91 and 102, unless the three impedance elements pick up sequentially in the order, Z3, Z2 and Z1, with at least a predetermined time-interval between each, the time-interval between Z3 and Z2 being at least the four or five cycles required for the X8 relay to drop out, and the time-interval between Z2 and Z1 being at least the fraction of a cycle, or even one or two cycles, required for the Y relay to pick up. In this manner, I avoid the possibility of an out-of-synchronism response, resulting in a tripping operation, in the event of a second-zone fault which is very close to the balance-point of the second-zone relay, yet within a said balance-point, so that the second-zone impedance-element responds sluggishly, and after the predetermined time-delay of four or five cycles which is fixed by the delayed-action relay X8.

It will be understood that the interlocking of the out-of-synchronism tripping-response with a subsequent response of the first-zone impedance-element, such as Z1C, occurring after the second-zone impedance-response, such as Z2C, as shown in Fig. 6, may also be embodied in the connections shown in Figs. 2 and 3. It should also be understood that the responses in Figs. 3 and 6 may be polyphase, as in Fig. 2, rather than single-phase, as illustrated in Figs. 3 and 6.

In all of the embodiments of my invention, it should also be understood that the various impedance-elements, of differing degrees of sensitivities, as symbolized by the first-zone, second-zone and third-zone elements, may be regarded as illustrative or symbolic of means for responding to any line-condition change which slowly increases in degree during the progress of an out-of-synchronism cycle, so as to cause the successive operation or response of a plurality of relays of varying degrees of sensitivities, with a predetermined time-delay therebetween, during an out-of-synchronism cycle, as distinguished from the practically instantaneous response of said elements during suddenly occurring fault-conditions affecting said relays. At relaying points remote from the electrical center of the interconnection between the out-of-step portions of the transmission system, the voltage-dips during the out-of-synchronism cycle are relatively slight, so that the third-zone, second-zone and first-zone impedance-elements respond sequentially in response to the waxing and waning of the line-current, very much like over-current relays of different sensitivities; and even at other relaying points, where large voltage-dips may occur during out-of-synchronism conditions, the impedance-elements respond to the waxing and waning of the line-current, as well as to the dipping and restoration of the line-voltage, during the out-of-synchronism cycle.

While I have illustrated my invention in five different illustrative forms of embodiments, it will be obvious that many changes, such as those which have been suggested during the course of the description, and other changes not alluded to, may be made by those skilled in the art, without departing from the essential features of my invention. I desire, therefore, that the appended claims shall be accorded the broadest construction consistent with their language and the prior art.

I claim as my invention:

1. Means for detecting an out-of-synchronism condition in an alternating-current line, comprising a sensitive impedance-responsive line-condition-responsive relaying means, a less sensitive impedance-responsive line-condition-responsive relaying-means, time-delayed means for effecting a predetermined out-of-synchronism response after a brief time-hesitation, in accordance with a predetermined response including a response to said sensitive relaying-means, and quick-acting means for interposing an impediment against the consummation of said predetermined out-of-synchronism response by said time-delayed means, in accordance with a predetermined response to line-conditions at the relaying station independently of line-conditions at any other station, said last mentioned means involving a response to said less sensitive relaying-means, said time-hesitation being, in general, longer than the time required for the response of said less sensitive relaying-means to fault-indicating line-conditions within its zone of response, and shorter than the minimum expectable time-interval between the attainment of line-conditions corresponding to the balance-points of the two impedance-responsive relaying-means during the progress of an out-of-synchronism cycle.

2. The invention as defined in claim 1, characterized by means for maintaining said predetermined out-of-synchronism response for a time long enough for the release of the sensitive relaying-means during a half-cycle of an out-of-synchronism cycle.

3. The invention as defined in claim 1, characterized by means for maintaining said predetermined out-of-synchronism response for a predetermined time after it is once consummated.

4. Means for detecting an out-of-synchronism condition in an alternating-current line, comprising a sensitive impedance-response line-condition-responsive relaying-means, a less sensitive impedance-responsive line-condition-responsive relaying-means, time-delayed means for effecting a predetermined out-of-synchronism response after a brief time-hesitation, in accordance with a predetermined response including a response to said sensitive relaying-means, quick-acting means for interposing an impediment against the consummation of said predetermined out-of-synchronism response by said time-delayed means, in accordance with a predetermined response including a response to said less sensitive relaying-means, said time-hesitation being, in general, longer than the time required for the response of said less sensitive relaying-means to fault-indicating line-conditions within its zone of response, and shorter than the minimum expectable time-interval between the attainment of line-conditions corresponding to the balance-points of the two impedance-responsive relaying-means during the progress of an out-of-synchronism cycle, and means responsive to any response of the less sensitive relaying-means during the continuance of said predetermined out-of-synchronism response.

5. Means for detecting an out-of-synchronism condition in an alternating-current line, comprising a sensitive time-delayed non-directional impedance-responsive line-condition-responsive relaying-means for effecting a predetermined out-of-synchronism response to a fault-indicating line-condition after a brief time-hesitation, and a less sensitive quick-acting non-directional impedance-responsive line-condition-responsive relaying-means for interposing an impediment against the consummation of said predetermined out-of-synchronism response by said time-delayed relaying-means, said time-hesitation being, in general, longer than the time required for the response of said less sensitive relaying-means to fault-indicating line-conditions within its zone of response, and shorter than the minimum expectable time-interval between the attainment of line-conditions corresponding to the balance-points of the two impedance-responsive relaying-means during the progress of an out-of-synchronism cycle.

6. The invention as defined in claim 5, characterized by means for maintaining said predetermined out-of-synchronism response for a time long enough for the release of the sensitive non-directional relaying-means during a half-cycle of an out-of-synchronism cycle.

7. The invention as defined in claim 5, characterized by means for maintaining said predetermined out-of-synchronism response for a predetermined time after it is once consummated.

8. The invention as defined in claim 5, characterized by means responsive to a non-responding condition of both of said non-directional relaying-means for discontinuing said predetermined out-of-synchronism response.

9. The invention as defined in claim 5, characterized by means responsive to any response of the less sensitive non-directional relaying-means during the continuance of said predetermined out-of-synchronism response.

10. Means for detecting an out-of-synchronism condition in an alternating-current line, comprising a sensitive impedance-responsive line-condition-responsive relaying-means, a less sensitive impedance-responsive line-condition-responsive relaying-means, time-delayed means for effecting a predetermined out-of-synchronism response after a brief time-hesitation, in accordance with a predetermined kind of response of said sensitive relaying-means, and quick-acting means for interposing an impediment against the consummation of said predetermined out-of-synchronism response by said time-delayed means, in accordance with a corresponding response of said less sensitive relaying-means, said time-hesitation being, in general, longer than the time required for the response of said less sensitive relaying-means to fault-indicating line-conditions within its zone of response, and shorter than the minimum expectable time-interval between the attainment of line-conditions corresponding to the balance-points of the two impedance-responsive relaying-means during the progress of an out-of-synchronism cycle.

11. The invention as defined in claim 10, characterized by means operative, within not more than a brief time-hesitation, in response to a return to a non-corresponding condition of said sensitive relaying-means, to discontinue said predetermined out-of-synchronism response.

12. Means for detecting an out-of-synchronism condition in an alternating-current line, comprising a sensitive impedance-responsive line-condition-responsive relaying-means, a less sensitive impedance-responsive line-condition-responsive relaying-means, time-delayed means for effecting a predetermined out-of-synchronism response after a brief time-hesitation, in accordance with a predetermined response to line-conditions at the relaying station independently of line-conditions at any other station, said last-mentioned means involving a response to said sensitive relaying-means, and quick-acting means for interposing an impediment against the consummation of said predetermined out-of-synchronism response by said time-delayed means, said last-mentioned means operating in accordance with the same kind of predetermined response to line-conditions at the relaying station independently of line-conditions at any other station except that it responds to said less sensitive relaying-means instead of responding to said sensitive relaying-means.

13. Means for detecting an out-of-synchronism condition in a polyphase line, comprising a sensitive polyphase-fault impedance-responsive relaying-means for responding to a fault-indicating line-condition, but only when said fault-indicating line-condition is an approximately symmetrical polyphase fault-condition, a less sensitive phase-fault impedance-responsive relaying-means, time-delayed means for effecting a predetermined out-of-synchronism response after a brief time-hesitation, in accordance with a predetermined response to line-conditions at the relaying station independently of line-conditions at any other station, said last-mentioned means involving a response to said sensitive relaying-means, and quick-acting means for interposing an impediment against the consummation of said predetermined out-of-synchronism response by said time-delayed means, said last-mentioned means operating in accordance with the same kind of predetermined response to line-conditions at the relaying station independently of line-conditions at any other station except that it responds to said less sensitive relaying-means instead of responding to said sensitive relaying-means, and that it responds to non-polyphase, as well as polyphase, faults.

14. Means for detecting an out-of-synchronism condition in an alternating-current line, comprising a sensitive impedance-responsive line-condition-responsive relaying-means, time-delayed means for effecting a predetermined out-of-synchronism response after a brief time-hesitation, in accordance with a predetermined response including a response to said sensitive relaying-means, and a less sensitive quick-acting non-directional impedance-responsive line-fault-responsive relaying-means for interposing an impediment against the consummation of said predetermined out-of-synchronism response by said time-delayed means.

15. Means for detecting an out-of-synchronism condition in a polyphase line, comprising a sensitive impedance-responsive relaying-means for responding to a fault-indicating line-condition, time-delayed means for effecting a predetermined out-of-synchronism response after a brief time-hesitation, in accordance with a predetermined response including a response to said sensitive relaying-means, and a less sensitive quick-acting polyphase-fault impedance-responsive relaying-means, responsive only to approximately symmetrical polyphase fault-conditions, for interposing an impediment against the consummation of said predetermined out-of-synchronism response by said time-delayed means.

16. Means for detecting an out-of-synchronism condition in a polyphase line, comprising a sensitive polyphase-fault impedance-responsive relaying-means for responding to a fault-indicating line-condition, but only when said fault-indicating line-condition is an approximately symmetrical polyphase fault-condition, a less sensitive polyphase-fault impedance-responsive relaying-means, responsive only to approximately symmetrical polyphase-fault indicating line-conditions, time-delayed means for effecting a predetermined out-of-synchronism response after a brief time-hesitation, in accordance with a predetermined response including a response to said sensitive relaying-means, and quick-acting means for interposing an impediment against the consummation of said predetermined out-of-synchronism response by said time-delayed means, in accordance with a predetermined response including a response to said less sensitive relaying-means, said time-hesitation being, in general, longer than the time required for the response of said less sensitive relaying-means to fault-indicating line-conditions within its zone of response, and shorter than the minimum expectable time-interval between the attainment of line-conditions corresponding to the balance-points of the two impedance-responsive relaying-means during the progress of an out-of-synchronism cycle.

17. Means for detecting an out-of-synchronism condition in a polyphase line, comprising a sensitive time-delayed non-directional polyphase-fault impedance-responsive relaying-means for effecting a predetermined out-of-synchronism response to a fault-indicating line-condition after a brief time-hesitation, but only when said fault-indicating line-condition is an approximately symmetrical polyphase fault-condition, and a less sensitive quick-acting non-directional impedance-responsive line-condition-responsive relaying-means for interposing an impediment against the consummation of said predetermined out-of-synchronism response by said time-delayed relaying-means, said time-hesitation being, in general, longer than the time required for the response of said less sensitive relaying means to fault-indicating line-conditions within its zone of response, and shorter than the minimum expectable time-interval between the attainment of line-conditions corresponding to the balance-points of the two impedance-responsive relaying-means during the progress of an out-of-synchronism cycle.

18. Means for detecting an out-of-synchronism condition in a polyphase line, comprising a sensitive time-delayed non-directional impedance-responsive line-condition-responsive relaying-means for effecting a predetermined out-of-synchronism response to a fault-indicating line-condition after a brief time-hesitation, and a less sensitive quick-acting non-directional polyphase-fault impedance-responsive relaying-means, responsive only to approximately symmetrical polyphase fault-conditions, for interposing an impediment against the consummation of said predetermined out-of-synchronism response by said time-delayed relaying-means, said time-hesitation being, in general, longer than the time required for the response of said less sensitive relaying means to fault-indicating line-conditions within its zone of response, and shorter than the minimum expectable time-interval between the attainment of line-conditions corresponding to the balance-points of the two impedance-responsive relaying-means during the progress of an out-of-synchronism cycle.

19. Means for detecting an out-of-synchronism condition in a polyphase line, comprising a sensitive time-delayed non-directional polyphase-fault impedance-responsive relaying-means for effecting a predetermined out-of-synchronism response to a fault-indicating line-condition after a brief-time hesitation, but only when said fault-indicating line-condition is an approximately symmetrical polyphase fault-condition, and a less sensitive quick-acting non-directional polyphase - fault impedance - responsive relaying - means, responsive only to approximately symmetrical polyphase fault-conditions, for interposing an impediment against the consummation of said predetermined out-of-synchronism response by said time-delayed relaying-means, said time-hesitation being, in general, longer than the time required for the response of said less sensitive relaying-means to fault-indicating line-conditions within its zone of response, and shorter than the minimum expectable time-interval between the attainment of line-conditions corresponding to the balance-points of the two impedance-responsive relaying-means during the progress of an out-of-synchronism cycle.

20. A fault-responsive protective relaying system for a polyphase line, with provision for out-of-synchronism conditions comprising a first-zone quick-acting directional impedance-responsive relaying-means for promptly effecting a line-sectionalizing operation in response to line-faults, a second-zone time-delayed directional impedance-responsive relaying-means, sensitive to more distant line-faults than the first-zone relaying-means, for effecting a line-sectionalizing operation after a time-delay sufficient, in general, for the completion of a circuit-interrupting operation by first-zone relaying-means at a point closer to the fault, a sensitive time-delayed non-directional impedance-responsive relaying-means, sensitive to more distant line-faults than the second-zone relaying-means, operative, after a brief time-hesitation, to interpose an impediment against the consummation of tripping operations by both said first-zone and said second-zone relaying-means, and a less sensitive quick-acting non-directional impedance-responsive relaying-means, less sensitive than said sensitive non-directional relaying-means, but at least as sensitive as said second-zone directional relaying-means, for blocking said interposition of an impediment by said sensitive time-delayed non-directional relaying-means, said time-hesitation being, in general, longer than the time required for the response of either one of said quick-acting relaying-means to fault-indicating line-conditions within their respective zones of operation, and shorter than the minimum expectable time-interval between the attainment of line-conditions corresponding to the balance-points of the non-directional impedance-responsive relaying-means during the progress of an out-of-synchronism cycle.

21. A fault-responsive protective relaying system for a polyphase line, with provision for out-of-synchronism conditions, comprising a first-zone quick-acting non-directional impedance-responsive relaying-means for responding to fault-indicating line-conditions, a second-zone quick-acting non-directional impedance-responsive relaying-means for responding to line-conditions corresponding to more distant line-faults than the first-zone relaying-means, a third-zone time-delayed non-directional impedance-responsive relaying-means for responding, after a brief time-hesitation, to line-conditions corresponding to more distant line-faults than the second-zone relaying-means, a quick-acting directional relaying-means responsive to line-conditions, quick-acting relaying-means jointly responsive to said first-zone and directional relaying means for quickly effecting a predetermined relaying-circuit condition for bringing about a line-sectionalizing operation, time-delayed relaying-means jointly responsive to said second-zone and directional relaying-means for effecting said predetermined relaying-circuit condition after a time-delay sufficient, in general, for the completion of a circuit-interrupting operation by a first-zone and directional relaying-means at a point closer to the fault, means responsive to said time-delayed third-zone relaying means for interposing an impediment against the consummation of said predetermined relaying-circuit condition both by the quick-acting joint response of said first-zone and directional relaying-means and by the time-delayed joint response of said second-zone and directional relaying-means, and quick-acting means responsive to said second-zone non-directional relaying-means, for blocking the interposition of said impediment, said time-hesitation being, in general, longer than the time required for the response of either one of said quick-acting relaying-means to fault-indicating line-conditions within their respective zones of operation, and shorter than the minimum expectable time-interval between the attainment of line-conditions corresponding to the balance-points of the third-zone and second-zone impedance-responsive relaying means during the progress of an out-of-synchronism cycle.

22. A fault-responsive protective relaying system for a polyphase line, with provision for out-of-synchronism conditions, comprising a first-zone quick-acting non-directional impedance-responsive relaying-means for responding to fault-indicating line-conditions, a second-zone quick-acting non-directional impedance-responsive relaying-means for responding to line-conditions corresponding to more distant line-faults than the first-zone relaying-means, a third-zone time-delayed non-directional impedance-responsive relaying-means for responding, after a brief time-hesitation, to line-conditions corresponding to more distant line-faults than the second-zone relaying-means, a quick-acting directional relaying-means responsive to line-conditions, quick-acting relaying-means jointly responsive to said first-zone and directional relaying-means for quickly effecting a predetermined relaying-circuit condition for bringing about a line-sectionalizing operation, time-delayed relaying-means jointly responsive to said second-zone and directional relaying-means for effecting said predetermined relaying-circuit condition after a time-delay sufficient, in general, for the completion of a circuit-interrupting operation by a first-zone and directional relaying-means at a point closer to the fault, means responsive to said time-delayed third-zone relaying-means for interposing an impediment against the consummation of said predetermined relaying-circuit condition both by the quick-acting joint response of said first-zone and directional relaying-means and by the time-delayed joint response of said second-zone and directional relaying-means, and quick-acting means, separately responsive to said first-zone and said second-zone non-directional relaying means, whichever one operates first, for blocking the interposition of said impediment, said time-hesitation being, in general, longer than the time required for the response of either one of said quick-acting relaying-means to fault-indicating line-conditions within their respective zones of operation, and shorter than the minimum expectable time-interval between the attainment of line-conditions corresponding to the balance-point of the third-zone impedance-responsive relaying-means and the attainment of line-conditions corresponding to the balance-point of either the first-zone or second-zone impedance-responsive relaying-means, whichever balance-point of the first-zone or second-zone impedance-responsive relaying-means is attained first, during the progress of an out-of-synchronism cycle.

23. A fault-responsive protective relaying system for a polyphase line, with provision for out-of-synchronism conditions, comprising a first-zone quick-acting non-directional impedance-responsive relaying - means for responding to fault-indicating line-conditions, a second-zone quick-acting non-directional impedance-responsive relaying-means for responding to line-conditions corresponding to more distant line-faults than the first-zone relaying-means, a third-zone quick-acting non-directional impedance-responsive relaying-means for responding to line-conditions corresponding to more distant line-faults than the second-zone relaying-means, a quick-acting directional relaying-means responsive to line-conditions, quick - acting relaying - means jointly responsive to said first-zone and directional relaying-means for quickly effecting a predetermined relaying-circuit condition for bringing about a line-sectionalizing operation, time-delayed relaying-means jointly responsive to said second-zone and directional relaying-means for effecting said predetermined relaying-circuit condition after a time-delay sufficient, in general, for the completion of a circuit-interrupting operation by a first-zone and directional relaying-means at a point closer to the fault, time-delayed relaying-means jointly responsive to said third-zone and directional relaying-means for effecting said predetermined relaying-circuit condition after a time-delay sufficient, in general, for the completion of a circuit-interrupting operation by a second-zone and directional relaying-means at a point closer to the fault, time-delayed relaying-means responsive, after a brief time-hesitation, to said third-zone non-directional impedance-responsive relaying-means, for interposing an impediment against the consummation of said predetermined relaying-circuit condition both by the quick-acting joint response of said first-zone and directional relaying-means and by the time-delayed joint response of said second-zone and directional relaying-means and by the time-delayed joint response of said third-zone and directional relaying-means, and quick-acting means responsive to said second-zone non-directional relaying means, for blocking the interposition of said impediment, said time-hesitation being, in general, longer than the time required for the response of either one of said quick-acting relaying-means to fault-indicating line-conditions within their respective zones of operation, and shorter than the minimum expectable time-interval between the attainment of line-conditions corresponding to the balance-points of the third-zone and second-zone impedance-responsive relaying-means during the progress of an out-of-synchronism cycle.

24. A fault-responsive protective relaying system for a polyphase line, with provision for out-of-synchronism conditions, comprising a first-zone quick-acting directional impedance-responsive relaying-means for promptly effecting a line-sectionalizing operation in response to line-faults, a second-zone time-delayed directional impedance-responsive relaying-means, sensitive to more distant line-faults than the first-zone relaying-means, for effecting a line-sectionalizing operation after a time-delay sufficient, in general, for the completion of a circuit-interrupting operation by a first-zone relaying-means at a point closer to the fault, a sensitive time-delayed non-directional impedance-responsive relaying-means, sensitive to more distant line-faults than the second-zone relaying-means, operative, after a brief time-hesitation, to interpose an impediment against the consummation of tripping operations by both said first-zone and said second-zone relaying-means, and a less sensitive quick-acting non-directional impedance-responsive relaying-means, less sensitive than said sensitive non-directional relaying-means but more sensitive than said second-zone directional relaying-means, for blocking said interposition of an impediment by said sensitive time-delayed non-directional relaying-means, said time-hesitation being, in general, longer than the time required for the response of either one of said quick-acting relaying-means to fault-indicating line-conditions within their respective zones of operation, and shorter than the minimum expectable time-interval between the attainment of line-conditions corresponding to the balance-points of the two non-directional impedance-responsive relaying-means during the progress of an out-of-synchronism cycle.

25. The invention as defined in claim 20, characterized by a third-zone time-delayed directional impedance-responsive relaying-means, sensitive to more distant line-faults than the second-zone relaying-means, for effecting a line-sectionalizing operation after a time-delay sufficient, in general, for the completion of a circuit-interrupting operation by a second-zone relaying-means at a point closer to the fault.

26. Means for detecting an out-of-synchronism condition in an alternating-current line, comprising a sensitive line-condition-responsive relaying-means, a less sensitive line-condition-responsive relaying-means, time-delayed means for effecting a predetermined out-of-synchronism response after a brief time-hesitation, in accordance with a predetermined response including a response to said sensitive relaying-means, and quick-acting means for interposing an impediment against the consummation of said predetermined out-of-synchronism response by said time-delayed means, in accordance with a predetermined response to line-conditions at the relaying station independently of line-conditions at any other station, said last-mentioned means involving a response to said less sensitive relaying-means, said time-hesitation being, in general, longer than the time required for the response of said less sensitive relaying-means to fault-indicating line-conditions within its limiting operating-conditions, and shorter than the minimum expectable time-interval between the attainment of line-conditions corresponding to the limiting operating-conditions of the sensitive and less sensitive relaying-means, respectively, during the progress of an out-of-synchronism cycle.

27. The invention as defined in claim 26, characterized by means for maintaining said predetermined out-of-synchronism response for a time long enough for the release of the sensitive relaying-means during a half-cycle of an out-of-synchronism cycle.

28. The invention as defined in claim 26, characterized by means for maintaining said predetermined out-of-synchronism response for a predetermined time after it is once consummated, and for discontinuing said response at the termination of said predetermined time.

29. Means for detecting an out-of-synchronism condition in an alternating-current line, comprising a sensitive line-condition-responsive relaying-means, a less sensitive line-condition-responsive relaying-means, time-delayed means for effecting a predetermined out-of-synchronism response after a brief time-hesitation, in accordance with a predetermined response including a response to said sensitive relaying-means, quick-acting means for interposing an impediment against the consummation of said predetermined out-of-synchronism response by said time-delayed means, in accordance with a predetermined response including a response to said less sensitive relaying-means, said time-hesitation being, in general, longer than the time required for the response of said less sensitive relaying-means to fault-indicating line-conditions within its limiting operating conditions, and shorter than the minimum expectable time-interval between the attainment of line-conditions corresponding to the limiting operating-conditions of the sensitive and less sensitive relaying-means, respectively, during the progress of an out-of-synchronism cycle, and means responsive to any response of the less sensitive relaying-means during the continuance of said predetermined out-of-synchronism response.

30. The invention as defined in claim 29, in combination with a third line-condition-responsive relaying-means which is still less sensitive than said less sensitive relaying means, and means responsive solely to a sequential response of said third relaying-means occurring subsequently to a response of said less sensitive relaying means during the continuance of said predetermined out-of-synchronism response.

31. The invention as defined in claim 4, in combination with a third line-condition-responsive relaying-means which is still less sensitive than said less sensitive relaying-means, and means responsive solely to a sequential response of said third relaying-means occurring subsequently to a response of said less sensitive relaying means during the continuance of said predetermined out-of-synchronism response.

32. The invention as defined in claim 5, in combination with means responsive to a non-responding condition of both of said non-directional relaying-means for discontinuing said predetermined out-of-synchronism response, a third quick-acting non-directional impedance-responsive line-condition-responsive relaying-means which is still less sensitive than said less sensitive relaying-means, and means responsive solely to a sequential response of said third relaying-means occurring subsequently to a response of said less sensitive relaying means during the continuance of said predetermined out-of-synchronism response.

33. Means for detecting an out-of-synchronism condition in an alternating-current line, comprising a sensitive line-condition-responsive relaying-means, a less sensitive line-condition-responsive relaying-means, time-delayed means for effecting a predetermined out-of-synchronism response after a brief time-hesitation, in accordance with a predetermined kind of response of said sensitive relaying-means, and quick-acting means for interposing an impediment against the consummation of said predetermined out-of-synchronism response by said time-delayed means, in accordance with a corresponding response of said less sensitive relaying-means, said time-hesitation being, in general, longer than the time required for the response of said less sensitive relaying-means to fault-indicating line-conditions within its limiting operating-conditions, and shorter than the minimum expectable time-interval between the attainment of line-conditions corresponding to the limiting operating-conditions of the sensitive and less sensitive relaying-means, respectively, during the progress of an out-of-synchronism cycle.

34. Means for detecting an out-of-synchronism condition in an alternating-current line, comprising a sensitive line-condition-responsive relaying-means, a less sensitive line-condition-responsive relaying-means, time-delayed means for effecting a predetermined out-of-synchronism response after a brief time-hesitation, in accordance with a predetermined response to line-conditions at the relaying station independently of line-conditions at any other station, said last-mentioned means involving a response to said sensitive relaying-means, and quick-acting means for interposing an impediment against the consummation of said predetermined out-of-synchronism response by said time-delayed means, said last-mentioned means operating in accordance with the same kind of predetermined response except that it responds to said less sensitive relaying-means instead of responding to said sensitive relaying-means.

35. Means for detecting an out-of-synchronism condition in a polyphase line, comprising a sensitive polyphase-fault-responsive relaying-means for responding to a fault-indicating line-condition, but only when said fault-indicating line-condition is an approximately symmetrical polyphase fault-condition, a less sensitive phase-fault-responsive relaying-means, time-delayed means for effecting a predetermined out-of-synchronism response after a brief time-hesitation, in accordance with a predetermined response to line-conditions at the relaying station independently of line-conditions at any other station, said last-mentioned means involving a response to said sensitive relaying-means, and quick-acting means for interposing an impediment against the consummation of said predetermined out-of-synchronism response by said time-delayed means, said last-mentioned means operating in accordance with the same kind of predetermined response except that it responds to said less sensitive relaying-means instead of responding to said sensitive relaying-means, and that it responds to non-polyphase, as well as polyphase, faults.

36. Means for detecting an out-of-synchronism condition in a polyphase line, comprising a sensitive polyphase-fault-responsive relaying-means for responding to a fault-indicating line-condition, but only when said fault-indicating line-condition is an approximately symmetrical polyphase fault-condition, a less sensitive phase-fault-responsive relaying-means, time-delayed means for effecting a predetermined out-of-synchronism response after a brief time-hesitation, in accordance with a predetermined response to line-conditions at the relaying station independently of line-conditions at any other station, said last-mentioned means involving a response to said sensitive relaying-means, and quick-acting means for interposing an impediment against the consummation of said predetermined out-of-synchronism response by said time-delayed means, said last-mentioned means operating in accordance with the same kind of predetermined response except that it responds to said less sensitive relaying-means instead of responding to said sensitive relaying-means.

WILLIAM A. LEWIS.